(12) United States Patent
Wilson

(10) Patent No.: US 7,204,428 B2
(45) Date of Patent: Apr. 17, 2007

(54) IDENTIFICATION OF OBJECT ON INTERACTIVE DISPLAY SURFACE BY IDENTIFYING CODED PATTERN

(75) Inventor: Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 10/814,577

(22) Filed: Mar. 31, 2004

(65) Prior Publication Data

US 2005/0240871 A1 Oct. 27, 2005

(51) Int. Cl.
*G06K 19/06* (2006.01)
(52) U.S. Cl. .................... 235/494; 235/462.1; 235/491
(58) Field of Classification Search ................ 235/494, 235/462.11, 462.09, 462.1, 454
See application file for complete search history.

(56) References Cited

U.S. PATENT DOCUMENTS

| | | | |
|---|---|---|---|
| 4,992,650 A | | 2/1991 | Somerville |
| 6,340,119 B2 * | | 1/2002 | He et al. ................ 235/494 |
| 2002/0006786 A1 * | | 1/2002 | Mine .................... 455/414 |

OTHER PUBLICATIONS

Department of Defence, Department of Defense Logistics Automatic Identification Technology Handbook for Product and Shipping Label Quality Assurance, Feb. 15, 2000, p. 14, Section 3.3.3.6, http://www.dodait.com/conf/data1199/printquality/print0111r6.doc.*

"3.6 Interpolation in Two or More Dimensions." Numerical Recipes in C: The Art of Scientific Computing. Chapter 3. Interpolation and Extrapolation. © 1988-1992, Cambridge University Press, Numerical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®, " Dated Jul. 7, 2000 Available http://www.damstadt.gmd.de/ambiente/activities/interactable.html. Printed Nov. 21, 2003. 3pp.

Bier, Stone, Pier, Buston, and DeRose. " Toolglass and Magic Lenses: The See-Through Interface." *Proceedings of Siggraph '93* (Anahiem, Aug.). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

(Continued)

*Primary Examiner*—Michael G. Lee
*Assistant Examiner*—Kristy A. Haupt

(57) ABSTRACT

A coded pattern applied to an object is identified when the object is placed on a display surface of an interactive display. The coded pattern is detected in an image of the display surface produced in response to reflected infrared (IR) light received from the coded pattern by an IR video camera disposed on an opposite side of the display surface from the object. The coded pattern can be either a circular, linear, matrix, variable bit length matrix, multi-level matrix, black/white (binary), or gray scale pattern. The coded pattern serves as an identifier of the object and includes a cue component and a code portion disposed in a predefined location relative to the cue component. A border region encompasses the cue component and the code portion and masks undesired noise that might interfere with decoding the code portion.

26 Claims, 13 Drawing Sheets

OTHER PUBLICATIONS

"DiamondSpin—Begs for Direct Manipulation Technology Is it the Pen? Sony Leaps Out-of-the-Box Again with Gummi." Mitsubishi/Diamond Spin. CHI 2004 #3. Printed Apr. 30, 2004. 5pp.

Dietz and Leigh. "DiamondTouch: A Multi-User Touch Technology." *Uist '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://ww.election-cap.com/GraftCards.htm. Printed Jan. 20, 2004 and May 16, 2004. © 2003. 2 pp. total (3pp printed).

Fukuchi and Rekimoto. "Interaction Techniques for SmartSkin." *ACM UIST2002 demonstration*, 2002. 2 pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Fexible, Collaborative Organization on a Tabletop." *ACM CSCW 2002: Workshop on Colocated Tabletop Colaboration: Technologies and Directions*. New Orleans, LA. Nov. 2002. pp. 1-4.

Horn, Berthold K. P. "Robot Vision." the MIT Press. Available http://mitpress.mit.edu/catalog/item/default.asp?ttypeΛ2&tid=8388. Printed Dec. 17, 2003. 6 pp. total.

Horn, Berthold Klaus Raul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1 pg). Printed Dec. 30, 2003. 3 pp.

Ishii and Ullmer. "Tangible Bits: Towards Seamless Interfaces between People, Bits and Atoms." *Proceedings of CHI '97*, Mar. 22-27, 1997, Atlanta, George. © ACM 0-89791-802-9/97/03. pp. 1-8.

Ishii, Wishneski, Orbanes, Chun, and Paradiso, "PingPongPlus: Design of an Athletic-Tangible Interface for Computer-Supported Cooperative Play." *Proceedings of CHI'99*, May 15-20, 1999, © 1999 ACM. pp. 1-8.

Johanson, Kolodny, and Russell. "A Hand pose and Position Tracker for the Interactive Table." CD223 B Final Project. Available http://graphics.stanford.edu/~drussel/vision/tracker-report.html. Printed Dec. 16, 2003, 6pp.

Ju, Hurwitz, Judd, and Lee. "Counter Active: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Application (MVA2000)*, Tokyo, Japan. Nov. 2000. pp. 603-606.

Kato, Billinghurst, Poupyrev, Imamoto, and Tachibana. "VIrtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narta, and Ishii. "A Tangible Interface for IP Network Simulation." *CHI 2003*, Apr. 5-10, 2003, Ft. Lauderdale, FL ACM 1-58113-630-7/03/0004. 2 pp.

Koike, Sato, and Kobayashi. "Integrating Paper and Digital Information on EnhancedDesk: A Method for Realtime Finger Tacking on an Augmented Desk System." *ACM Transaction on Computer-Human Interaction*, vol. no. 4, Dec. 2001. © 2001 ACM 1073-0516/01/1200-0307. pp. 307-322.

Leibe, Stamer, Ribarsky, Wartell, Krum, Singletary, and Hodges. "The Perceptive work bench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USE. Undated. 2 pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2 pp.

Malandain, Grégoire. "Connected Components Extraction." Available http:/www-sop.inria.fr/epidaure/personnel/malandain/Segment/sonnexe.html. Printed Dec. 18, 2003. 3 pp.

Matsushita and Rekimoto. "HoloWall: Designing a Finger, Hand, Body, and Object Sensitive Wall." *UIST '97* Banffm Alberta, Canada, © 1997 ACM 0-89791-881-9/97/10. pp. 209-210.

Missouri Department Of Revenue. "2D Barcode Technology."Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters, vol1, 1. pp. 197-206.

Pangaro, Mayner-Aminzade, and Ishii. "The Actuated Workbench: Computer-Controlled Actuation in Tabletop Tangible Interfaces." *Proceedings of UIST 2002*, Oct. 27-30, 2002. © ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation for Digital Video." *UIST '03* Vancouver, B.C., Canada. © 2003 ACM 1-58113-636-06/03/0010. pp. 105-114.

Rekimoto and Ayatsuka. "CyberCode; Designing Augmented Reality Environments with Visual Tags." *Proc. of UIST 2000*, 2000. 10pp.

Rekimoto and Matsushita. "Perceptual Surface: Towards a Human and Object Sensitive Interactive Display." *Proceedings of Workshop on Perceptural User Interactes (PUI '97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces; A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmente Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manupulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin; An Infrastructure for Freehand Manipulation on Interactive Surface." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Piatform for Mixed Physical and Graphical Interactions." *SIGCHI'01*, Mar. 31-Apr. 2, 2001, Seattle, WA. © 2001 ACM 1-58113-327-08/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6 pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome,com.—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European COnference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © ACM 1-58113-560-2/02/0011. 10 pp.

Shen, Lesh, Moghaddam, Beardsley, and Bardsley. "Personal Digital Historian: User Interface Design." © Mitsubishi Electric Reseach Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 Acm 1-58113-702-8/04/0004. 8pp.

SMART Technologies Inc. White Paper. "DVit Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Stamer, Leibe, Singletary, Lyons, Gandy, and Pair. "Towards Augmented Reality Gaming." Available http://www.gvu.gatech.edy/ccg/publications/imagina2000/. Printed Dec. 30, 2003. 27pp.

Streitz, Geiβler, Holmer, Konomi, Müller-Tomfelde, Reischl, Rexrogh, Seitz, and Steinmetz. "i-LAND: An interactive Landscape for Creativity and Innovation." *Proceedings of the ACM Congerence on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3(2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light; An Optical Design Tool with a Luminous-Tangible Interface."*Proceedings of CHI '98*Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://wisilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

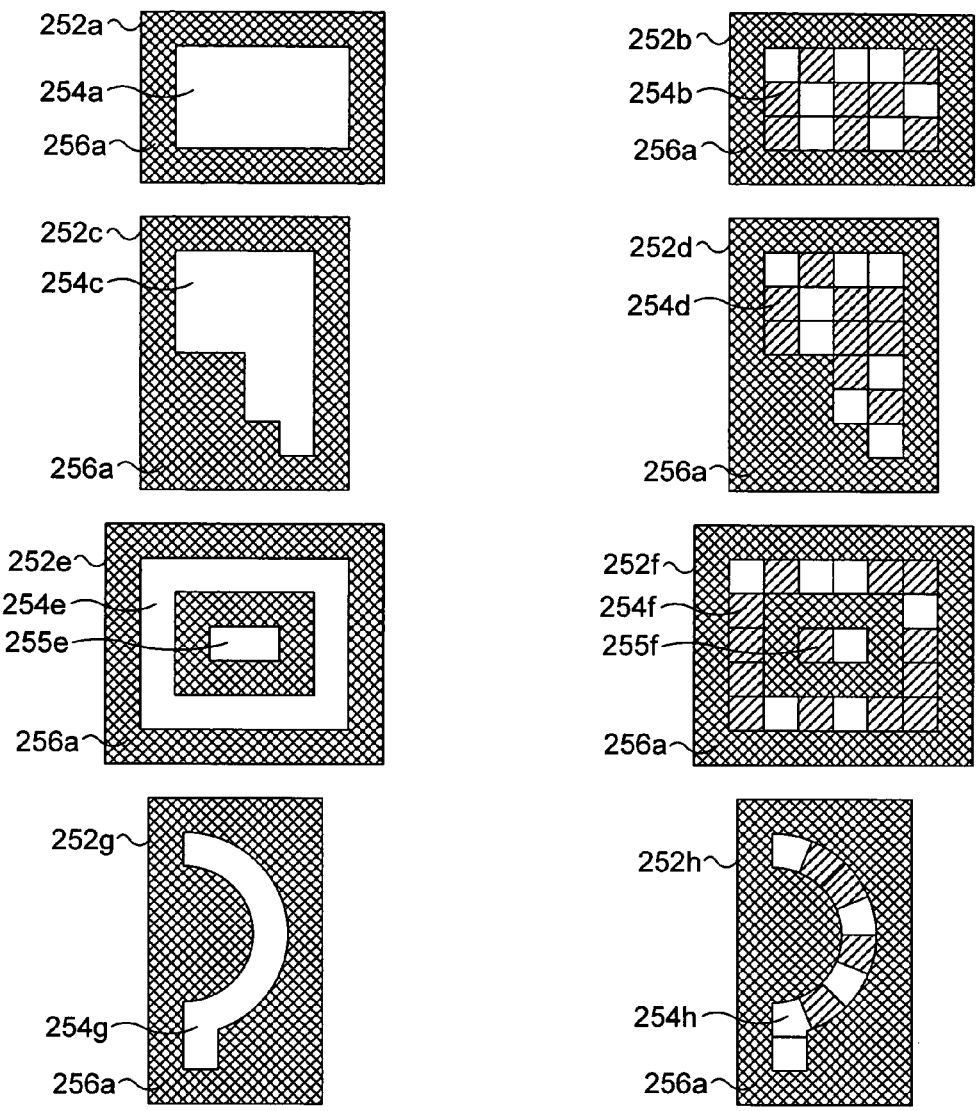
FIG. 13
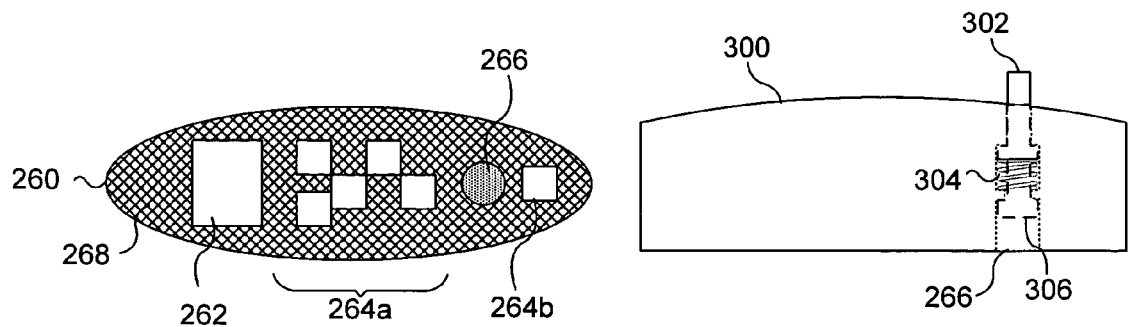
FIG. 14     FIG. 14A

IDENTIFICATION OF OBJECT ON INTERACTIVE DISPLAY SURFACE BY IDENTIFYING CODED PATTERN

FIELD OF THE INVENTION

The present invention generally pertains to the use of encoded patterns to optically identify objects, and more specifically, pertains to various encoded patterns that can be applied to an object to enable the object to be identified based on infrared light reflected from the pattern when the object is placed on or near the surface of an interactive display surface.

BACKGROUND OF THE INVENTION

Visual codes such as UPC symbols are commonly used to associate a unique identifier (a number or binary bit code) with a given physical object. This unique identifier is detected by employing image processing techniques that analyze the arrangement of parts of the visual pattern printed on the object. In designing such visual coding schemes, it is important to consider whether the pattern may be easily detected by imaging the object, the ease with which the identifier may be recovered from the pattern once the pattern is located in the image, and various features of the visual code such as the number of bits encoded, error detection and/or correction, rotation dependence or invariance, etc.

An application in which a visual code must be decoded can often impose constraints on the form of the visual code used to provide an identifier for an object. For example, the object on which the visual code is applied may be relatively small, so that the visual code has to be compact. Furthermore, the pattern employed for visual coding must be perceptible to the imaging system used to read it within the resolution constraints of that system. If the small object has a particular shape, for example, a round "foot print" on the surface where the visual code is to be detected, it would be desirable to use a circular visual code that generally matches that round shape of the object. Similarly, if a small object is rectangular or oval, it would be desirable for the shape of the object to assist in determining the orientation of the visual code, to facilitate decoding the pattern used in the code, to identify the object.

Visual codes used for UPC bar codes on products sold in markets or other retail establishments are typically read using a coherent light laser source to scan the bar codes. Such laser scanning systems have a relatively high resolution and employ laser sources with sufficiently high intensity to scan the bar codes without interference from ambient light. In contrast, it is much more difficult to decode a visual code on an object within a image, particularly, when the image is of a relatively large surface, such as the display surface of an interactive display. The imaging system must first detect an object in the image of the surface and then decode the pattern of the visual code applied to the object.

Interactive displays that employ visual codes to identify objects are known in the art. For example, an interactive display platform was developed in the MIT Media Lab, as reported by Brygg Ullmer and Hiroshi Ishii in "The meta-DESK: Models and Prototypes for Tangible User Interfaces," *Proceedings of UIST* 10/1997:14–17. The meta-DESK includes a near-horizontal graphical surface used to display two-dimensional geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera can detect reflected IR light from "hot mirrors," comprising a material backing on the undersurface of objects called "phicons" that are placed on the graphical surface. In response to the IR camera detecting an IR reflection from this material, which is transparent to visible light, applied to the bottom of a "Great Dome phicon," a map of the MIT campus is displayed on the graphical surface, with the actual location of the Great Dome in the map positioned where the Great Dome phicon is located. The paper does not provide any teaching or suggestion of using an IR pattern and does not teach or explain details concerning the manner in which it is detected and identified, other than noting that for each vision frame, the software produces "a list of unidentified 'blobs' extracted from the scene."

A similar approach to sensing objects on a display surface is disclosed in several papers published by Jun Rekimoto of Sony Computer Science Laboratory, Inc. in collaboration with others. These papers briefly describe a "HoloWall" and a "HoloTable," both of which use IR light to detect objects that are proximate to or in contact with a display surface on which a rear-projected image is visible. The rear-projection panel, which is vertical in the HoloWall and horizontal in the HoloTable, is semi-opaque and diffusive, so that objects become more clearly visible as they approach and then contact the panel. Although mention is made of using IR detectable patterns on objects for identifying them, again, no details are provided about the IR pattern or about how the IR pattern is detected to identify the objects.

Many types of visual codes are known in the prior art. However, given the limitations on resolution and other constraints mentioned above, it is likely that many of the prior art visual codes designed to work with high resolution scanners will not be suitable for use with a vision system that must use reflected IR light in an image of an entire display surface to read a visual code applied to a relatively small object in the image. Accordingly, it would be desirable to employ visual codes that are appropriate for the shape and size of the objects to be identified, and which can be identified with a vision sensing system having relatively limited resolution. A suitable encoded pattern should be sufficiently easy to decode to enable realtime decoding while an object having the encoded pattern is being moved about on a surface. It would be desirable that the pattern provide a relatively high contrast IR in the image of the surface, to enable the pattern to be decoded through a diffusing surface, since many prior art encoded patterns require too great a resolution to be usable on such a surface. A further desirable characteristic of a suitable encoding pattern is that it have an innate orientation, to reduce the search space required to find the encoded pattern on a surface. For similar reasons, the encoded pattern should preferably be recognizable as a single connected component, to facilitate detecting and decoding it. The prior art does not address many of these problems, which are more specific to a diffusing display surface and vision sensing system, as described above.

SUMMARY OF THE INVENTION

One of the advantages of the present invention is that it enables an appropriate identifier to be employed for an object that is used with an interactive display table, based upon the shape and size of the object, the limitations imposed by the resolution of the vision sensing system used to image the identifier and the requirements of the software application with which the object is used. One aspect of the invention is thus directed to a two-dimensional identifier that is applied to an object for encoding a value so that the value is determinable when the two-dimensional identifier is placed adjacent to the surface sensing system of the interactive table. The two-dimensional identifier includes a cue component having a contiguous area of a detectable material to which the surface sensing system is responsive. The cue component is approximated as an ellipse when detected by the surface sensing system, and the ellipse has axes that indicate an orientation of the two-dimensional identifier relative to a coordinate system of the surface sensing system. A code portion of the identifier is disposed in a predefined location relative to the cue component. The code portion encodes the value with at least one binary element that is detectable by the surface sensing system. Also included is a border region that encompasses the cue component and the code portion. The border region includes a non-detectable material that is not sensed as part of the two-dimensional identifier by the surface sensing system and which functions as an interference mask around the cue component and the code portion, to minimize noise. The detectable material comprises a reflective material that reflects infrared light to which the surface sensing system responds.

Several different types of encoding are used in the identifier. In one, a radial code is used for encoding the value, and in this type of encoding, the cue component comprises a contiguous radial area of the detectable material. The radial area includes a sub-area of the non-detectable material disposed at a first predefined radius from a center of the radial area. The sub-area represents a start bit that indicates a start location from which the code portion is to be read. Also, the code portion is configured in a region disposed at a second predefined radius from the center of the radial area, and the second predefined radius is greater than the first predefined radius, so that the code portion generally extends around the cue component.

Another encoding scheme employs a variable length linear code for encoding the value. In this scheme, the cue component comprises parallel strips of the detectable material that are of substantially equal length and are connected at a first end by a predefined area of the detectable material used as a start bit. The parallel strips are separated by the non-detectable material at a second end, which is opposite the first end, and the non-detectable material at the second end is used as an end bit. The code portion includes a pattern of detectable areas and undetectable areas. Each detectable area and each undetectable area is of predefined dimensions and is disposed between the parallel strips and between the start bit and the end bit.

In another encoding scheme, a variable bit-length code is used for encoding the value. In this case, the cue component includes a predefined dimension and a variable length dimension. The predefined dimension is always smaller than the variable length dimension, and the variable length dimension indicates a reference orientation and an extent of the code portion. The code portion begins with a first binary element at a predefined offset from the cue component, and any additional binary elements extend away from the first binary element in at least one of three ways, including in a direction generally parallel to the reference orientation of the cue component, to form a row of binary elements that ends at the extent of the code portion indicated by the variable length dimension; or in a direction generally perpendicular to the variable length dimension, to form a matrix of binary elements that end when a row does not include at least one binary element that is detectable by the surface sensing system; or in predefined directions and predefined distances relative to an immediately preceding binary element, to form a series of binary elements at predefined locations relative to each other.

In another type of encoding, the value is encoded using a multi-level, variable bit-length code, so that the cue component is detectable at a binarization threshold and has a predefined shape with at least one variable length dimension. The at least one variable length dimension indicates a reference orientation and an extent of the code portion. The code portion comprises at least one binary element that is detectable at a gray scale threshold, but is not detectable at the binarization threshold. The at least one binary element that is detectable at the gray scale threshold is disposed within the cue component so that the cue component is uniform at the binarization threshold, but reveals the at least one binary element at the gray scale threshold. Also, the code portion can begin with a first binary element disposed at a predefined offset from a local origin and disposed at a predefined location relative to the cue component; any additional binary elements extend away from the first binary element in at least one of a direction generally parallel to an axis used by the surface sensing system, and predefined directions and predefined distances relative to an immediately preceding binary element, to form a series of binary elements at predefined locations relative to each other so that the code portion comprises a predefined shape.

Another aspect of the present invention is directed to a method for determining a value from a two-dimensional identifier applied to an object when the object is placed adjacent to a surface of a surface sensing system. The method detects identifiers generally like those discussed above.

Yet another aspect of the present invention is directed to a system for determining a value from a two-dimensional identifier applied to an object that includes an interactive display surface having an interactive side adjacent to which the object can be placed, and an opposite side. A light source in the system directs IR light toward the opposite side of the interactive display surface and through the interactive display surface, to the interactive side. A light sensor is disposed to receive and sense IR light reflected back from the patterned object through the interactive display surface, forming an image that includes the two-dimensional identifier applied to the object. A processor that is in communication with the light sensor executes machine instructions stored in a memory causing the processor to carry out a plurality of functions that are generally consistent with the steps of the method used for determining the value encoded by an identifier applied to an object placed on or near the interactive display surface.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 13 illustrates exemplary gray scale codes in accord with the present invention;

FIG. 14 illustrates an exemplary arbitrary shape code in accord with the present invention;

FIG. 14A illustrates an exemplary object with the arbitrary shape code of FIG. 14, and having a user activated button for modifying the shape code.

DESCRIPTION OF THE PREFERRED EMBODIMENT

Exemplary Computing System for Implementing Present Invention

Figure 1:
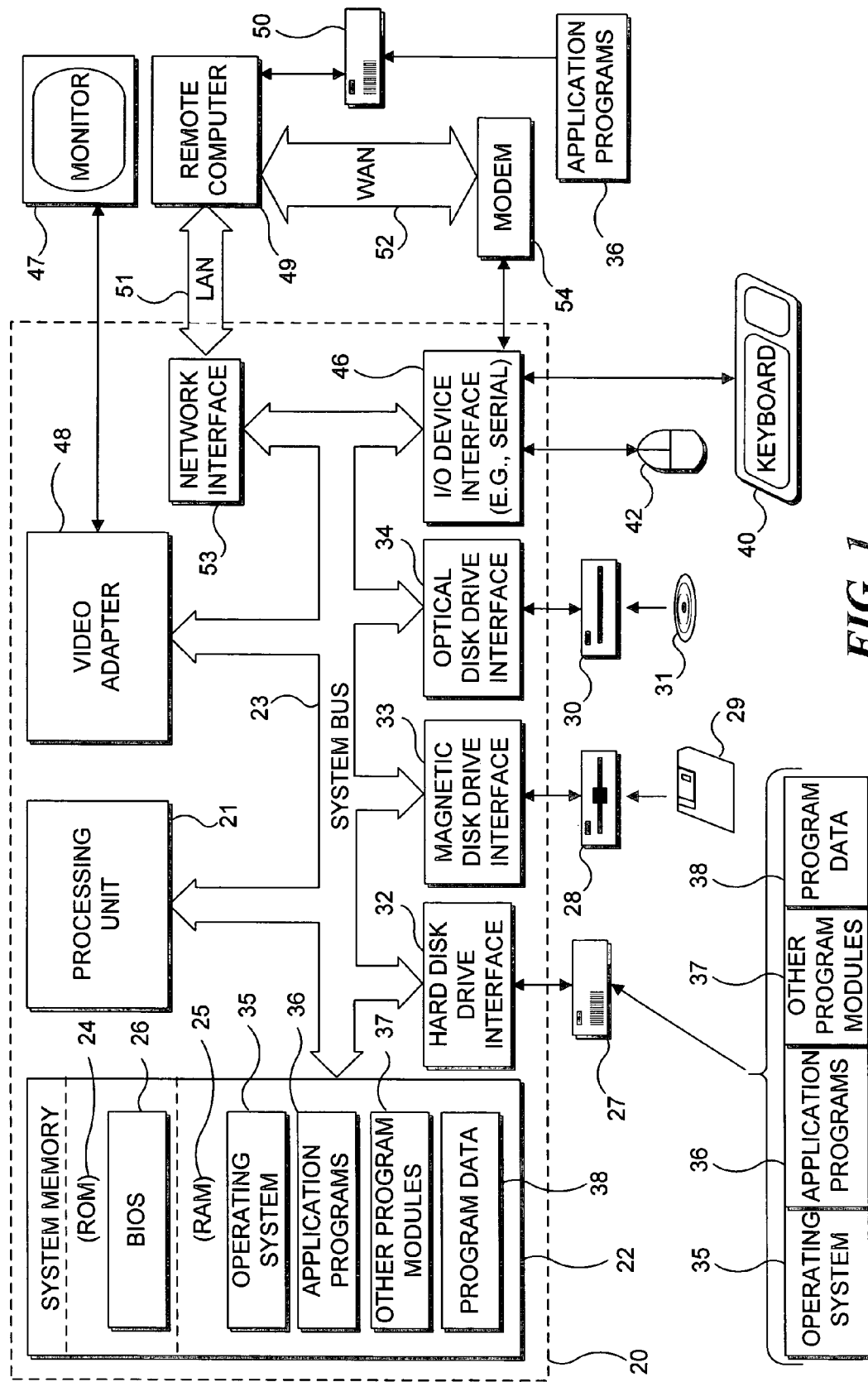
FIG. 1 is a functional block diagram of a generally conventional computing device or personal computer (PC) that is suitable for image processing for the interactive display table as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
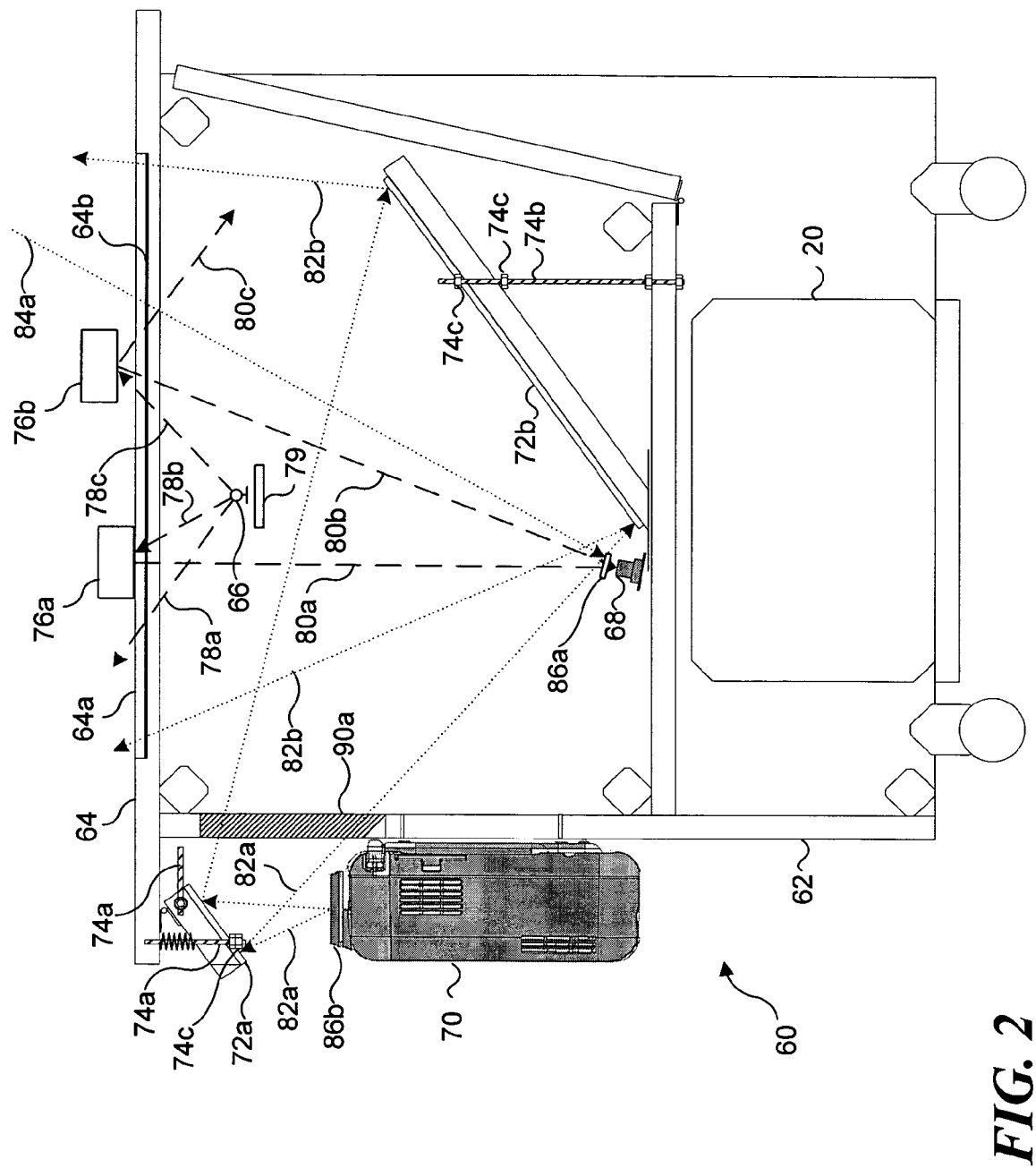
FIG. 2 is an illustration of the interior of the interactive display table showing hardware components included, and the paths followed by light within the interactive display table, and exemplary objects disposed on and above the surface of the interactive display table.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
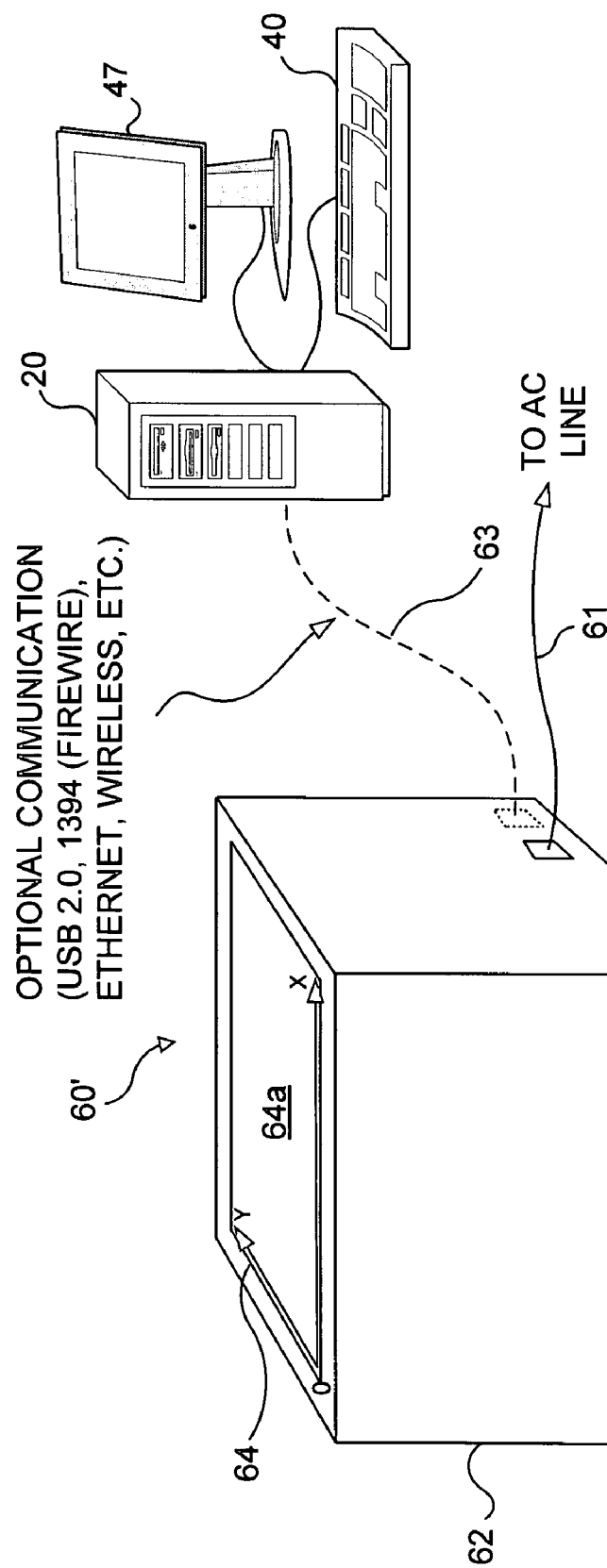
FIG. 3 is an isometric view of an interactive display table coupled to the PC externally.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table (i.e., of either embodiments discussed above) is its ability to display graphic images or a virtual environment for games or other software applications and to enable an interaction between the graphic image or virtual environment visible on display surface 64a and identify objects that are resting atop the display surface, such as an object 76a, or are hovering just above it, such as an object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

Object Code Recognition

Figure 4:
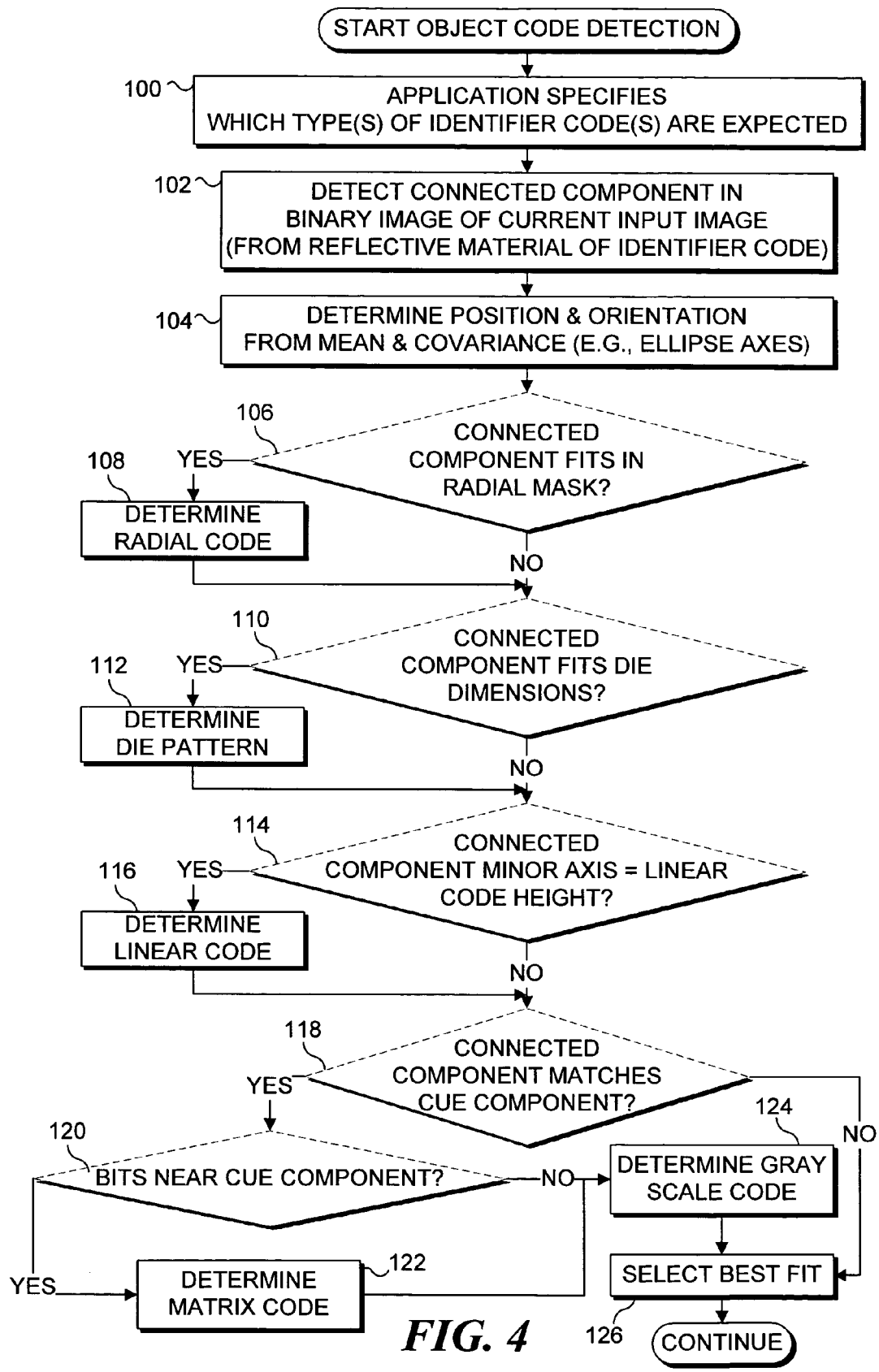
FIG. 4 is a flow chart illustrating the overall logic for recognizing a two-dimensional identifier code that is applied to an object placed on or near the display surface.

In FIG. 4 a flow diagram illustrates overall logic for recognizing a two-dimensional identifier code of a coded object. In a step 100, an application program, such as a game, specifies the type(s) of code(s) that the application expects to find attached to objects on the table. Code types usable in the present invention include circular, linear, matrix, variable bit length matrix, multi-level matrix, black/white (binary), and gray scale. Specifying the code type(s) can include loading code pattern characteristics, setting threshold values, and/or enabling templates for pattern recognition. Enabling a template can also include generating several rotated versions of the template to facilitate object recognition.

The remaining logic of FIG. 4 is preferably performed by an image processing module that communicates with a software application currently being executed. In this way, any software application can interface with the image processing module in a standardized manner. As described in further detail below, the image processing module performs a variety of functions related to detecting objects through shapes, pixel intensities, code types, and corresponding code values. Examples include template matching or thresholding to attempt to find a coded object wherever the object may appear on the table and at any orientation.

In a step 102, the image processing module detects a connected component in a binary image of a current input image produced by the IR video camera in response to reflected IR light received from the display surface of the table, from one or more objects that are on or near the display surface. In this exemplary embodiment of an IR vision system, the connected component comprises a set of adjacent "on" pixels in the binary image. The pixels include those portions of a two-dimensional identifier code comprising an IR reflective material that have reflected IR light back toward the IR video camera. The connected component can correspond to the entire identifier code attached to an object placed on the interactive table, or to a sub-component that is separate from a code portion of the identifier code. In some instances described below, the separate sub-component acts as a cue-component to help determine the position and orientation of the identifier code. In other instances, the whole identifier code serves as its own cue component for locating the position and orientation of the identifier code. The binary image is formed by determining which pixels of a normalized input image are above a predetermined binarization threshold. The connected component detection is performed using standard algorithms such as algorithms described by B. K. P. Horn (see *Robot Vision*).

In a step 104, the image processing module represents the connected component as an ellipse, and calculates a center and lengths of the major and minor axes of the ellipse. The image processing module then determines the mean and covariance values for pixel of the connected component to determine the position and orientation of the connected component relative to the interactive display table coordinates, based upon the statistical mean and covariance of pixels along the elliptical axes. For details of this technique, see "Connected Components Analysis" by Andrew Hunter, available at www.dur.ac.uk/andrew1.hunter/Vision/CV02ConnectedComponents.pdf.

Having determined the position and orientation of the connected component, the image processing module may perform one or more optional decision steps to facilitate determining the code type and value. In one embodiment, optional decision steps 106, 110, 114, 118, and 120 are not used and the process flows sequentially from step 104 through code determining steps 108, 112, 116, 122, 124, to a step 126 that ranks the results of the code determinations and selects the closest code type based on statistical analysis. In a second embodiment, these optional decision steps are used to select the code determining steps that should be executed. For example, an optional decision step 106 dictates whether a code determining step 108 should be executed. This embodiment thus functions as a filter to reduce the computations required for code detection.

To ensure a code type is not inadvertently discarded, a combination of the above techniques may be used. The combined technique may employ the optional decision steps to assign a "confidence" factor to each code type that is determined. For example, the image processing system can assign a confidence factor based on statistical analysis of a connected component fitting within a specified radius, as determined at decision step 106. Similarly, the image processing module can assign another confidence factor if the same connected component fits within a specified square area as determined at decision step 110. Other confidence factors can also be determined for the equality of a connected component minor axis to a specified length (as in decision step 114), the match of a connected component to a specified shape (as in decision step 118), or the proximity of bits to a connected component (as in decision step 120). In general, a confidence factor can be determined for each code type, and the confidence factor can be used in determining the code type that best fits the current detected component. For example, a confidence factor can be determined from how well the pixels "read," i.e., how clearly they cluster into black and white intensity levels, and also, how well the pixel values "read" as one of a valid bit code out of a codebook of valid codes. The confidence level can also be determined by whether the maximum and minimum pixel intensity levels differ by at least some predetermined value, since if the intensities differ by too small a value, it is possible that the pixels represent noise.

For exemplary purposes, FIG. 4 illustrates a combination of the first and second embodiments being used to filter out those code types that do not meet a minimum criterion for each code type, while determining a code value for each code type in which the connected component meets at least the minimum criterion. The optional decision steps may be performed alone or in any combination to initially screen the connected component for possible matching code types. For those code types that the connected component possibly matches, the image processing module preferably determines variances of the connected component from each possible matching code type. The image processing module then ranks the determinations by best fit to select the most closely matching code type and corresponding code value, as the code applied to the object.

As indicated above, in an optional decision step 106, the image processing module tests the connected component for fit within a specific radius or radial mask. If the lengths of the connected component axes and/or the sum of pixel values are within predefined ranges (i.e., the connected component fits within a radial mask), then the image processing module continues at a step 108 to determine the radial code. Details for determining the radial code are discussed below with regard to FIGS. 5 and 6. After determining the radial code, or if the connected component does not fit within the predefined radius or radial mask, processing continues at an optional decision step 110.

In optional decision step 110, the image processing module tests the connected component for fit within a specified square area corresponding to die dimensions. If the connected component matches a rotated white square template or if the primary and secondary axes are of equal length and correspond to predefined die dimensions (i.e., the connected component fits within the die dimensions), then the image processing module continues at a step 112 to determine the die spot pattern. Details for determining the die spot pattern are discussed below with regard to FIGS. 7 and 8. After determining the die spot pattern, or if the connected component does not fit within a specified square area corresponding to the known die dimensions, processing continues at an optional decision step 114.

In optional decision step 114, the image processing module tests the connected component secondary axis for equality to a predetermined length corresponding to a linear code height. If the length of the connected component short axis is equal to a predefined length (i.e., the connected component secondary axis is equal to the linear code height), then the image processing module continues at a step 116 to determine the linear code. Details for determining the linear code are discussed below with regard to FIGS. 9 and 10. After determining the linear code, or if the connected component secondary axis is not equal to a predetermined length, processing continues at an optional decision step 118.

In optional decision step 118, the image processing module tests the connected component for a match with a predetermined shape or cue component. If the connected component is not a linear shape with one known dimension (i.e., the connected component does not match the cue component), then the image processing module continues at step 126, otherwise the image processing module continues at optional decision step 120.

In optional decision step 120, the image processing module tests the connected component for nearby code bits. If the connected component has disconnected bits within a predetermined distance and orientation (i.e., the connected component has nearby code bits), then the image processing module continues at step 122 to determine the matrix code. Details for determining the matrix code are discussed below with regard to FIGS. 11 and 12. After determining the matrix code or if the connected component does not have disconnected bits within a predetermined distance and orientation (i.e., the connected component does not have nearby code bits), then the image processing module continues at step 124 to determine the gray scale code. Details for determining the gray scale code are discussed below with regard to FIGS. 13, 14, and 15. (Note that the logic flow from step 122 to step 124 refers to the sequential logic flow of the first embodiment.)

In step 126, the image processing module ranks the results of the code determination(s), and then performs a statistical analysis to select the code type that the connected component most likely fits. If the connected component is not detected as a code, then the image processing module may evaluate the connected component as being another type of object that does not have an attached identifier, such as the finger of the user, or a non-coded object, etc.

Radial Code Recognition

Figure 5:
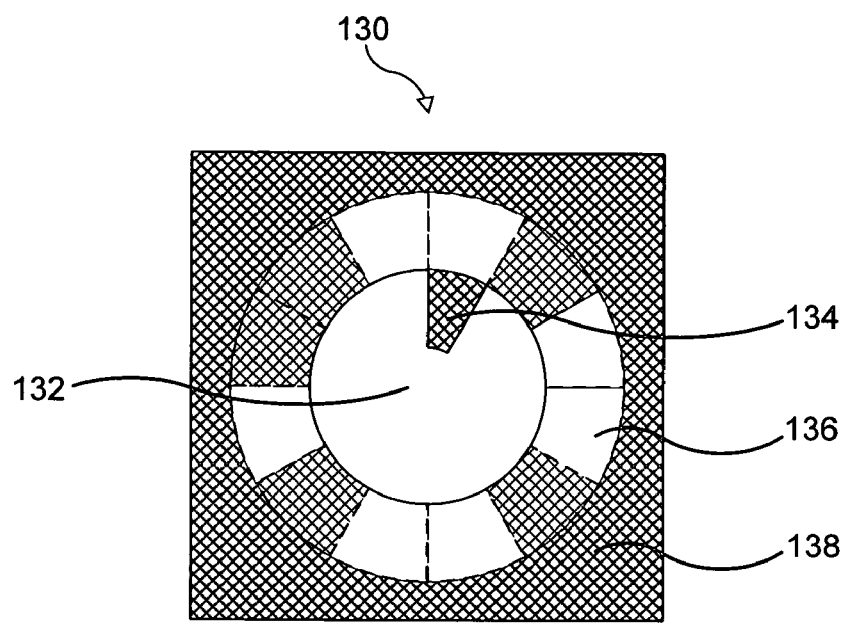
FIG. 5 illustrates an exemplary radial code in accord with the present invention.

FIG. 5 illustrates an exemplary radial code 130 that is particularly useful in providing an identifier for a round object, i.e., an object having a round "foot print." Radial code 130 comprises a light reflective inner circular area 132 with a dark "start bit" 134. Start bit 134 is preferably located at a predefined first radius from the center of the coded region, and can take the shape of a keystone, a pie slice, or any other shape that makes the start bit easy to locate. The start bit within the light reflective inner circular area defines a starting reference point from which the code value can be determined. The start bit, in conjunction with the light reflective inner circular area, also defines the orientation of the object to which the code is applied.

Radial code 130 also comprises an outer, evenly divided concentric annulus 136 with light and dark keystone-shaped "data bits." Annulus 136 is disposed at a second radius from the center that is greater than the first radius. Note that the dashed lines are only included in this Figure to more clearly indicate the disposition of the data bits. However, an actual radial code does not contain any such lines, and the entire light reflective area comprises a single connected component. In this case, the whole identifier code acts as its own cue component. The outer, evenly divided concentric annulus contains the value of the code as a series of light and dark keystone-shaped bits. The code value is read starting from the location of the start bit in a predefined clockwise (or alternatively, in a predefined counterclockwise) direction.

A dark background 138 surrounds radial code 130 so that the radial code can be easily detected as a connected component. The dark background minimizes the risk of "noise" pixels being considered as part of the connected component.

Figure 6:
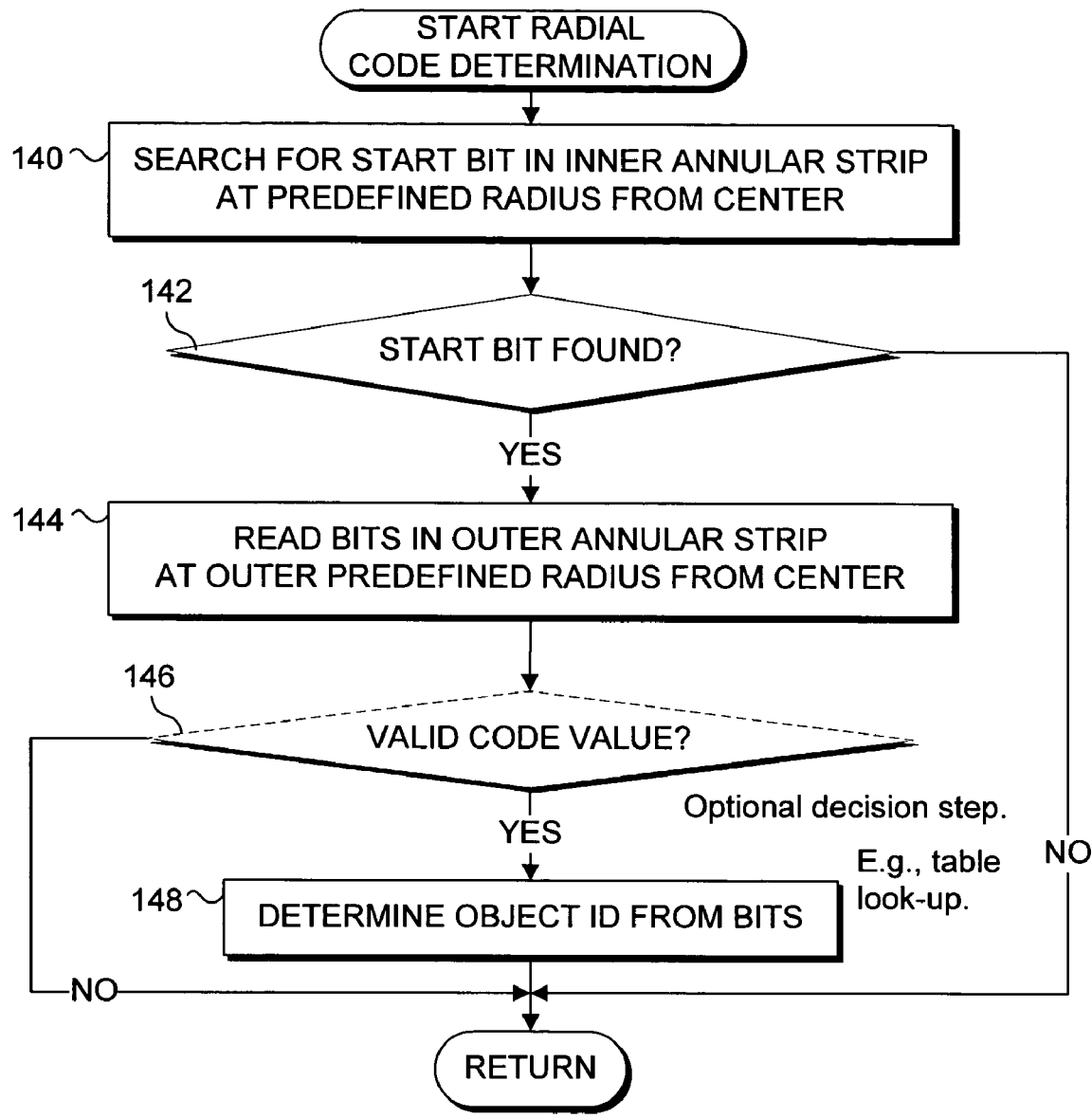
FIG. 6 is a flow chart illustrating the logic steps performed by an image processing module when determining a radial code applied to an object on the display surface.

In FIG. 6, a flow diagram illustrates the logical steps performed by the image processing module for processing a radial code. In a step 140, the image processing module searches for the start bit at a predefined radius from the center of the circular area. The search area is disposed within the radius of the data bits. In general, the image processing module can use a predefined fixed threshold to determine the value of any bit. However to improve reliability, the image processing module preferably calculates a threshold as the mean between minimum and maximum pixel values of the code pattern. As noted above, too small a difference between the minimum and maximum pixel values will likely be caused by an attempt to decode noise.

In a decision step 142, the image processing module determines whether the start bit was found at the predefined radius. If no start bit is found, the process for radial code determination ends. However, if a start bit is found, the image processing module continues with a step 144, reading the data bits at a predefined radius from the center of the circular area in a predefined clockwise (or counterclockwise) direction. The bits are of known radial width relative to transformed table coordinates from the input image.

An optional decision step 146 tests for a valid radial code. To test the validity of a radial code, the image processing module can attempt to verify that the detected bits represent a code value that exists in a table of possible valid code values. Alternatively, the image processing module can compare the connected component to templates of valid radial codes. This pattern matching technique is discussed in further detail with regard to FIG. 8. If the code detected is not a valid one, the process for radial code determination ends. If the code detected is valid, or if the optional validity check is not performed, the image processing module continues to a step 148 and determines an object ID from the bits detected in the code using a table lookup or other such method.

Die Matrix Code Recognition

Figure 7:
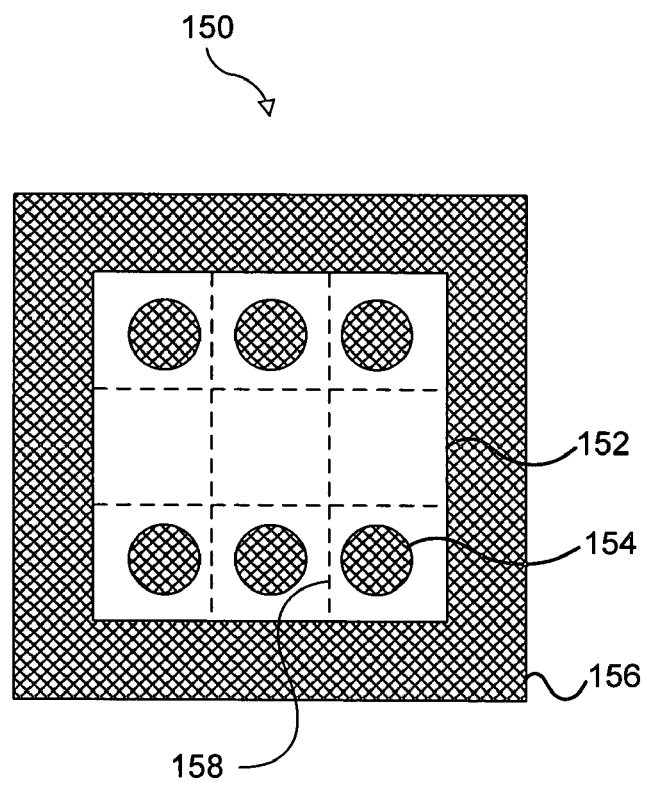
FIG. 7 illustrates an exemplary matrix code in accord with the present invention.

FIG. 7 illustrates an exemplary matrix code 150 useful in recognizing a square object, such as a die face. Matrix code 150 comprises a connected component square area 152 (which is shown as white) having from one to six data bits 154 (die spots) arranged in six predetermined patterns within a 3×3 grid 158. Note that the dashed lines are only included in the figure to illustrate the data bits; an actual die matrix code would not contain any lines.

Pixels of the die are read from the 3×3 grid within the square area. The 3×3 grid pattern is then compared to each of the six allowable die face patterns and, in the case of a "2," "3," or "6" spot die face, is also compared to a version of the die face pattern that is rotated 90 degrees. Alternately, a grid of any size and associated die face bit patterns can be read. Once the die face that is facing toward the display surface is identified, the die face that is facing upward is known, because opposite die faces always have a predefined relationship, i.e., the die face opposite a known die face has a number of spots equal to the difference between seven and the known die face.

A dark background 156 surrounds matrix code 150 so that the matrix code can be easily detected as a connected component. The dark background minimizes the risk of "noise" pixels from being considered as part of the connected component.

Figure 8:
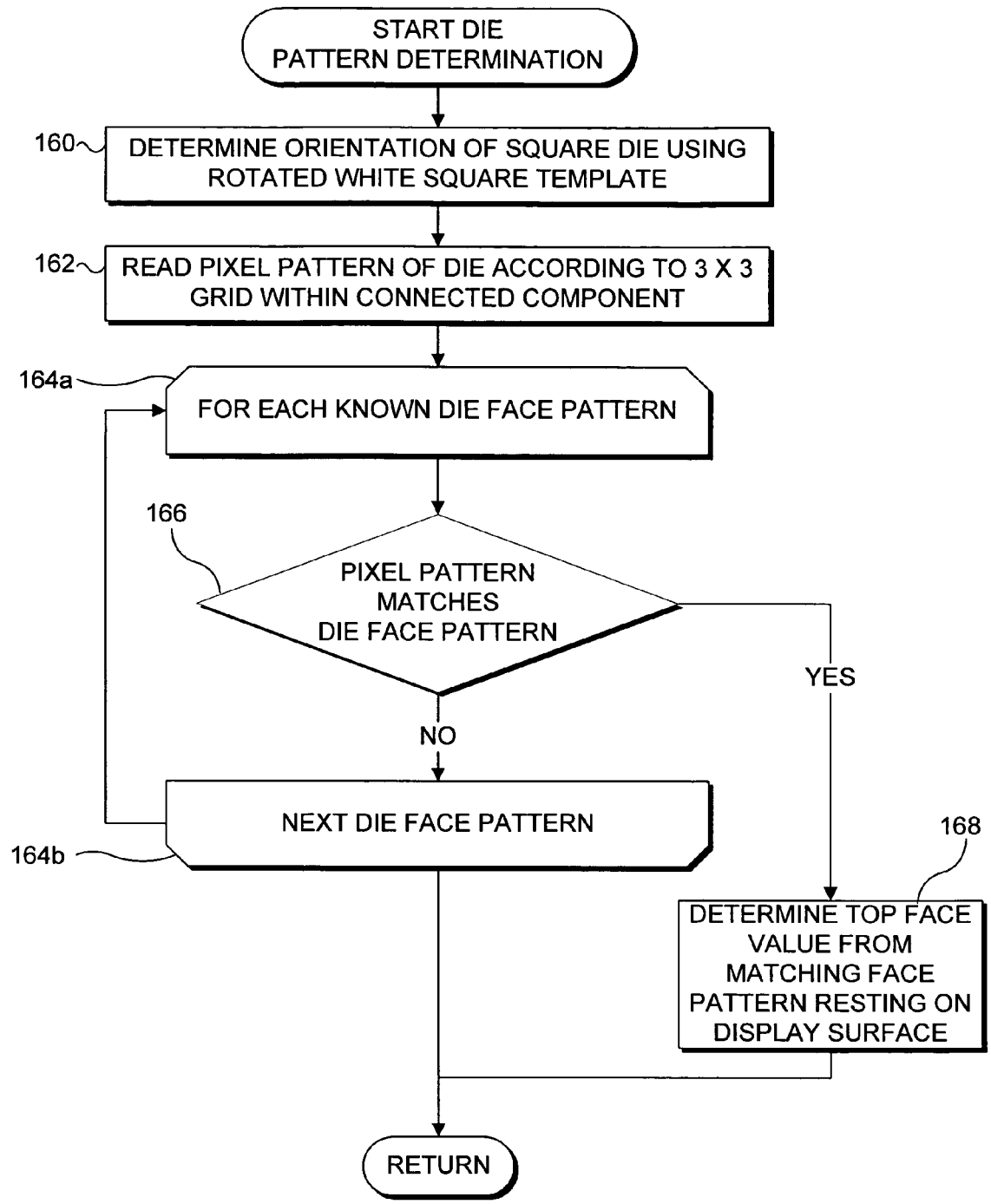
FIG. 8 is a flow chart showing the logical steps logic steps performed by an image processing module for determining a die matrix code.

In FIG. 8, a flow diagram illustrates logic steps performed by an image processing module for determining a die matrix code. In a step 160, the image processing module determines the orientation of the square connected component by rotating a white square template at predetermined angles through 90 degrees and matching the template to the connected component. The image processing module then continues at a step 162 to read the pixel pattern of the binarized image of the connected component from within a 3×3 grid.

A step 164*a* begins a process that iteratively examines each known die face pattern (and a version of the die face pattern that is rotated 90 degrees, in the cases of a die faces having "2," "3," or "6" spots). In a decision step 166, the pixel pattern read from the connected component is compared to a known die face pattern. If the pixel pattern matches the known die face pattern, the image processing module continues to a step 168 to determine the value of the top face of the die. As noted above, the sum of opposite faces on a die equals seven, so the value of the top face equals seven minus the number of spots in the detected pattern. After determining the top face value, the image processing module ends. If, however, no known die face pattern matches the connected component pixel pattern, the iterative process terminates at a step 164*b*.

Linear Code Recognition

Figure 9:
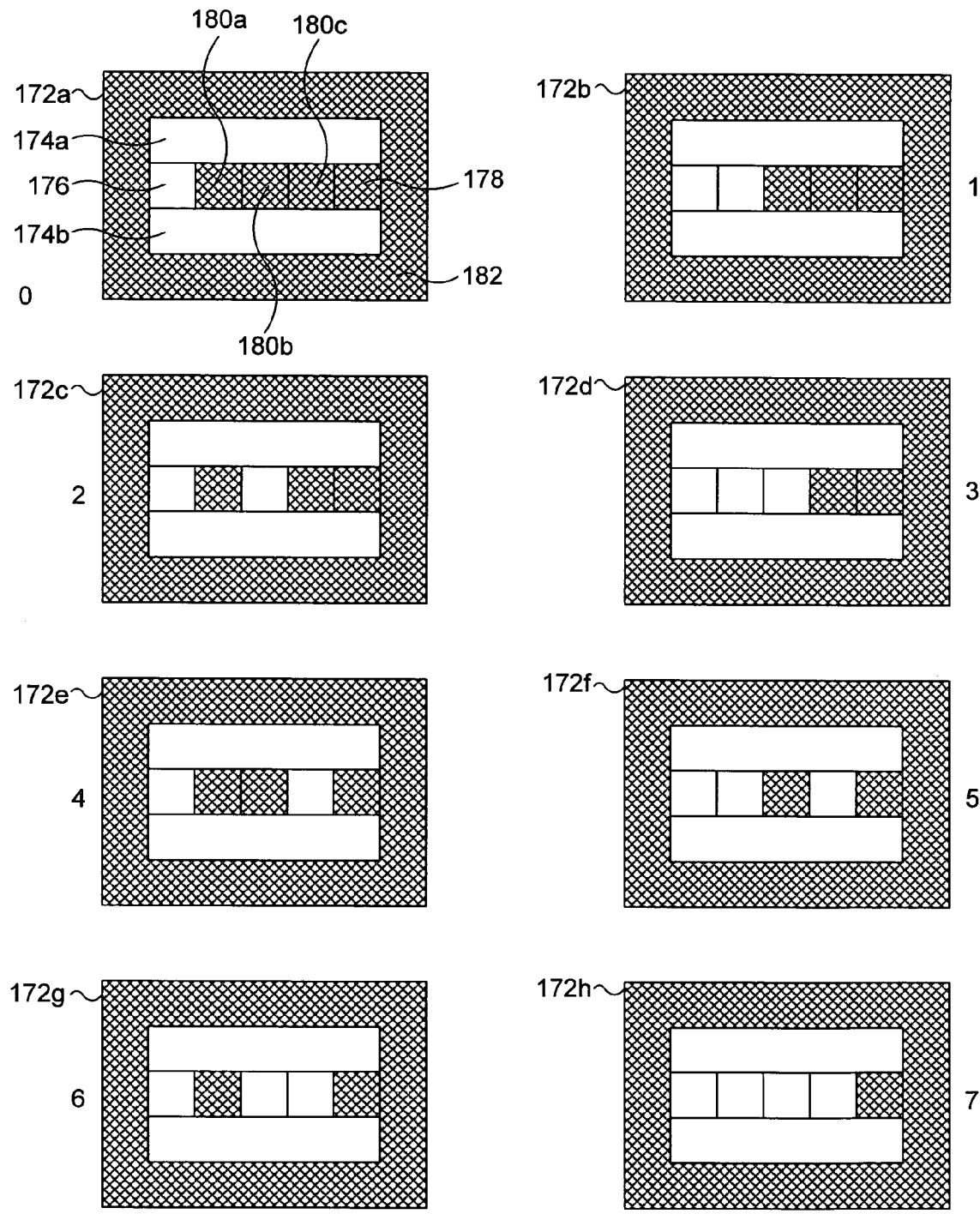
FIG. 9 illustrates an exemplary linear code in accord with the present invention.

FIG. 9 illustrates an exemplary linear code 170 useful in recognizing objects. A linear code 172 comprises two light parallel bars 174*a* and 174*b*, a light start bit 176, a dark stop bit 178, and a multiplicity of light or dark code bits 180. It will be apparent that the terms "light" and "dark" refer to the IR reflectance of the material applied to create the coded pattern on the object or on the material of the object itself. A light bit corresponds to a portion of the identifier that is a good reflector of IR light, while a dark bit or area corresponds to a portion of the identifier or the surrounding portion of the object that absorbs or does not reflect IR light very well. These terms are somewhat arbitrary, since an image of the display surface can readily be electronically inverted.

A dark background 182 surrounds the linear code so that the linear code can be easily detected as a connected component. The dark background minimizes the risk of "noise" pixels from being considered as part of the connected component. Again, note that the lines delineating the data bits are only included in the figure to illustrate the data bits. An actual linear code will typically not include any distinguishable lines.

Linear codes are connected components and are symmetric about a major or long axis. The orientation as computed from the connected component process may be 180 degrees off the true orientation of the object that displays the code. By examining the location of the start and stop bits, the decoding algorithm can correct for the orientation. The number of bits in a linear code is variable. Given the size (e.g., the width) of a bit, the number of bits in a linear code can be determined directly from the length of the light parallel bars. Exemplary linear codes 172*a* through 172*h* illustrate all eight instances of a 3-bit code.

Figure 10:
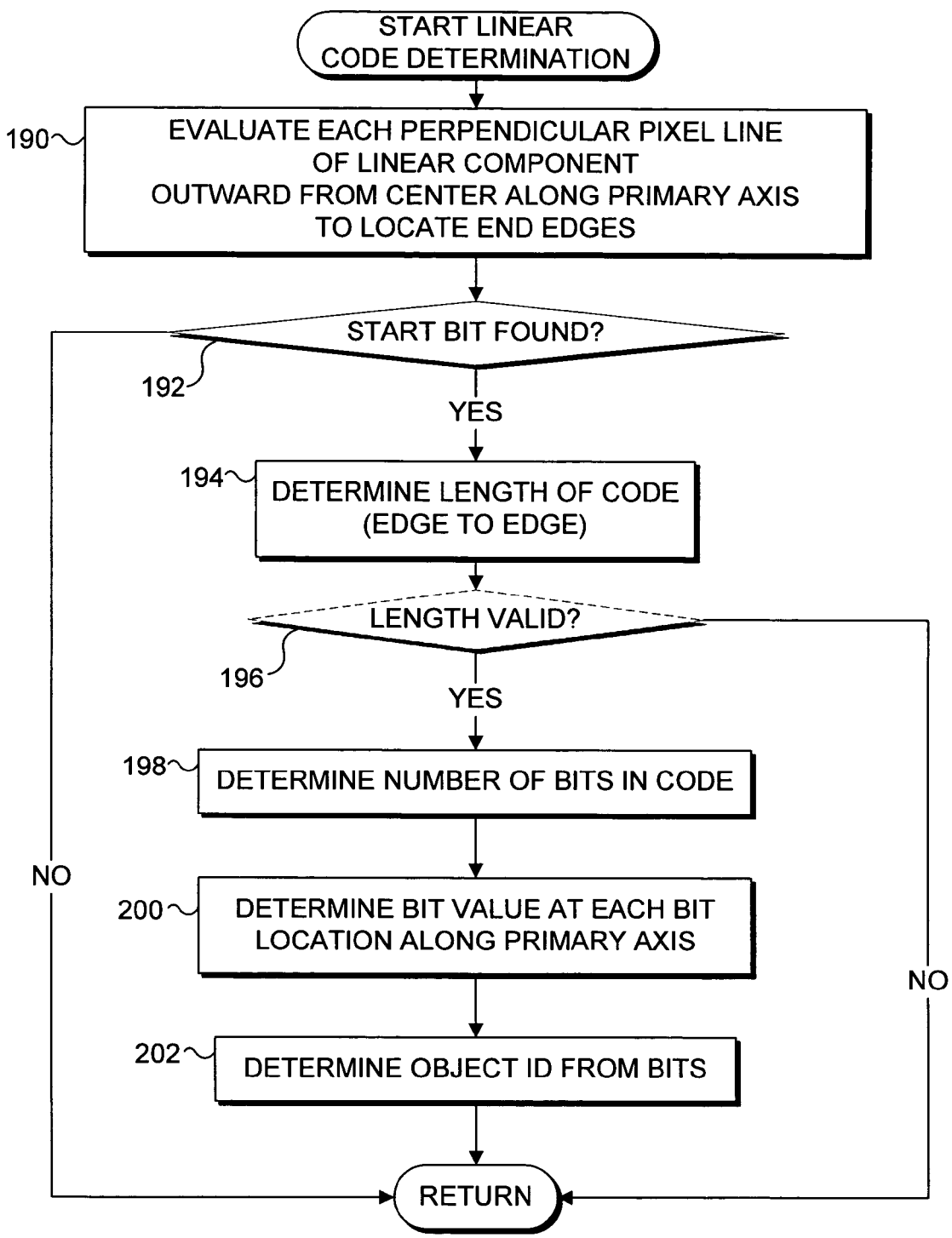
FIG. 10 is a flow chart illustrating the logical steps logic steps performed by the image processing module for determining a linear code.

In FIG. 10, a flow diagram illustrates the logical steps performed by the image processing module for determining a linear code. In a step 190, the image processing module locates the end edges of the connected component by starting at the center of the major (long) axis and summing pixel values in each line perpendicular to the major axis of the connected component. An end of the linear component is ascertained when the sum is zero or less than or equal to a predetermined low threshold. The end with the start bit will have a sum greater than the end with the end bit. In a decision step 192, the image processing module tests for the presence of the start bit. If a start bit is not found, the process for determining a linear code terminates, otherwise the process continues with a step 194 to determine the length of the code from the ends of the connected component found in step 190.

In an optional decision step 196, the image processing module tests for a valid code length. If the length of the code is not as expected, based upon the software application in which the object is being detected, the process for determining a linear code terminates. If the length of the code is as expected, as per the software application, or if the optional decision to test for a valid code length is not performed, the process continues with a step 198 to determine the number of bits in the code. The number of bits in the code is calculated from the formula:

Code Bits=(Connected Component Length/Bit Width)−2

The process continues with a step 200, to determine the value of each code bit along the major or primary axis. A code bit value could be determined by any of the following:
- based on the value of a pixel at the center of the code bit;
- by comparing the mean value of the sum of all pixel values within the area of the code bit with a predetermined threshold value; if the mean value is greater than the predetermined threshold value, then the code bit value is "1;"
- by pattern matching; or
- using some other technique.

The process continues at a step 202, to determine an object ID from the value of the code bits via table lookup or other such method.

Variable Bit-Length Matrix Code Recognition

Figure 11:
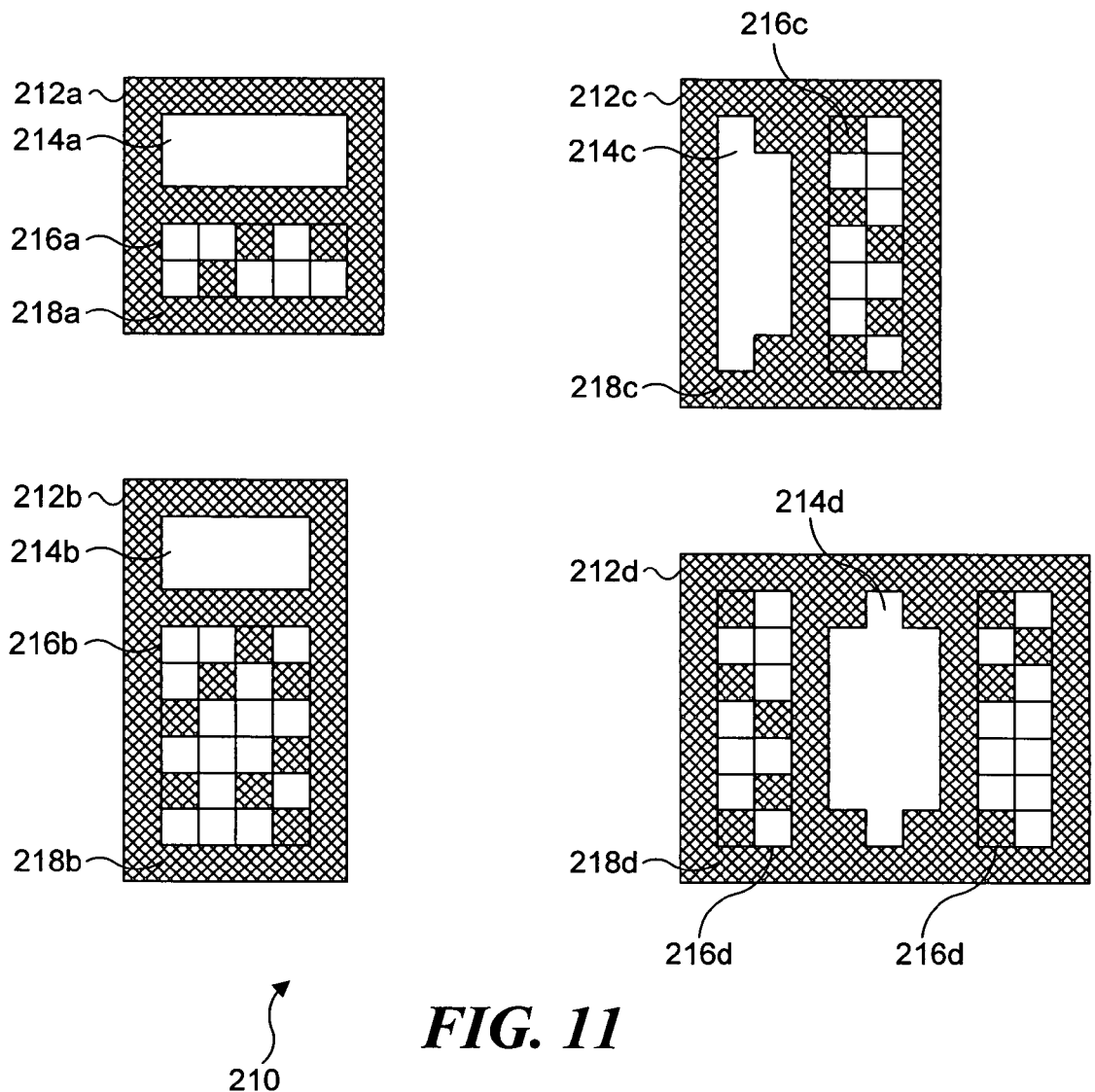
FIG. 11 illustrates an exemplary variable bit-length matrix code in accord with the present invention.

FIG. 11 illustrates an exemplary variable bit-length matrix code 210 useful in recognizing objects. A variable bit-length matrix code 212 comprises a light rectangular-shaped connected "cue" component 214. The minor or short axis of the cue component has a fixed length whereas the major or long axis may be of any length (greater than the minor axis). The estimation of orientation of the variable bit-length matrix code is derived in much the same way as the linear code. The orientation of the cue component is correct up to a 180-degree rotation, which may then be corrected by determining the side of the cue component on which the bit field is disposed. Preferably, the shape of the cue component improves orientation reliability of the corresponding elliptical model.

The variable bit-length matrix code also comprises a matrix field 216, which is disposed a fixed distance away from the major axis of the cue component on one or both side of the cue component. Note that the lines delineating the data bits are only included in the figure to illustrate the data bits; an actual matrix field would not contain any visible lines. The width of the matrix field is equal to the length of the major axis of the cue component. The matrix field includes one or more rows of data bits. Each row of the matrix field contains at least one light or white bit, so that a decoding algorithm may determine the number of rows of bits by reading successive rows from the cue component outward until no white bits are found in a row. Alternately, the number of rows in the matrix field may be encoded into the first row of the matrix field. In conjunction with the variable length major axis of the cue component, the variable number of rows enables the code to be shaped appropriately to fit various object sizes. The matrix field can comprise one or more checksum bits, such that after the bit sequence is decoded by image analysis, errors in the decoding may be detected. Checksum bits can also be used to determine whether the decoding process has read the bit sequence from the correct side of the cue component if there is no other procedure to determine that issue. Such an algorithm may simply attempt decoding from both sides of the cue component, and use the valid sequence as the correct bit pattern. Alternately, the shape of the cue component can indicate the side of the matrix on which the code is disposed.

The variable bit-length matrix code is surrounded by a dark background 218. The dark background enables easy detection of the cue component as a connected component and minimizes the risk of "noise" pixels being considered part of the cue component and matrix field.

Figure 12:
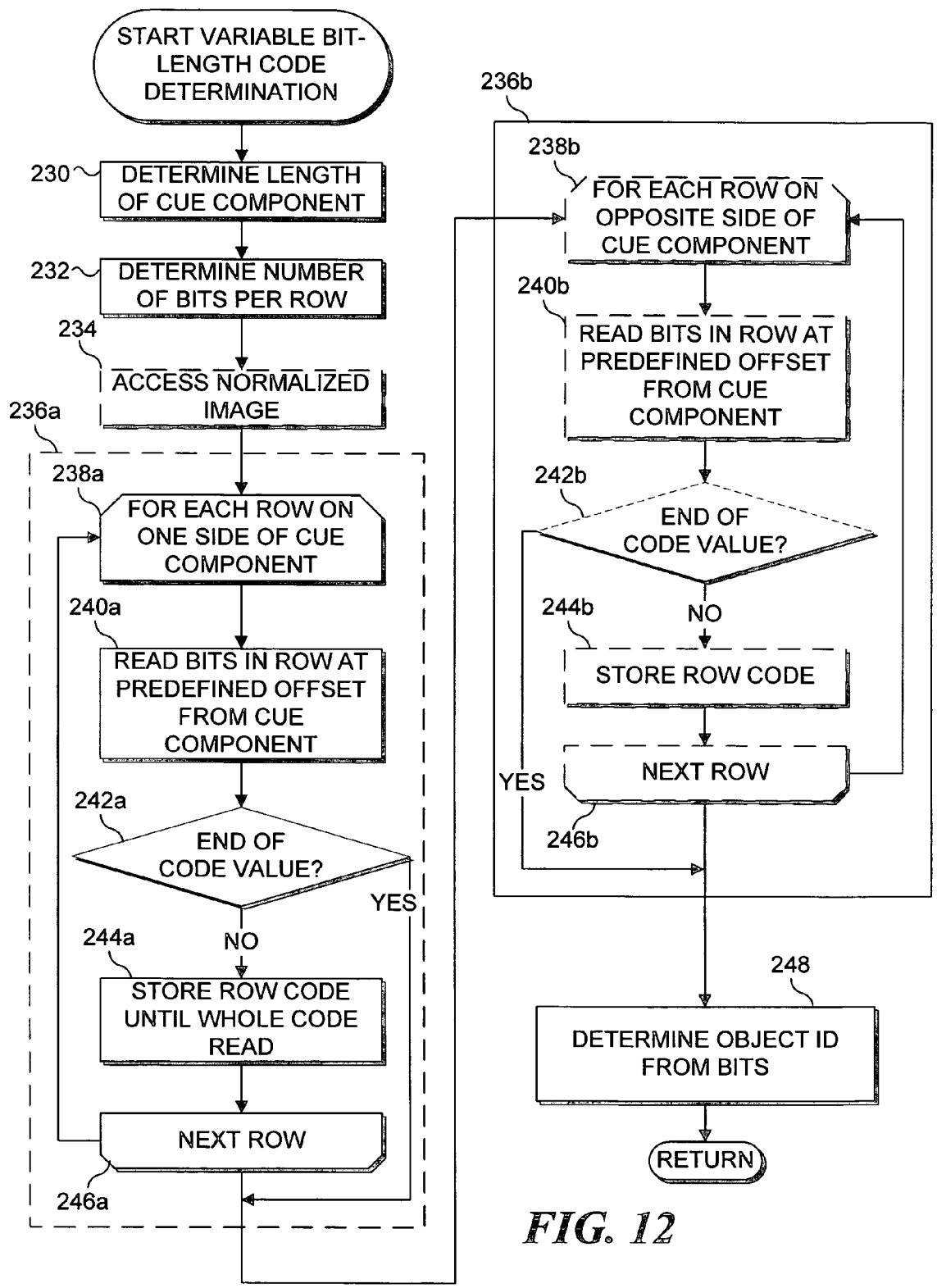
FIG. 12 is a flow chart showing the logical steps for determining a variable bit-length matrix code applied to an object.

In FIG. 12, a flow diagram illustrates logic steps performed by the image processing module for determining a variable bit-length matrix code. In a step 230, the image processing module determines the length of the cue component. The image processing module represents the cue component as an ellipse and calculates a center and the lengths of the major and minor axes of the ellipse. The image processing module then determines the position and orientation of the cue component relative to table coordinates, from the statistical mean and covariance of the elliptical axes.

The processing continues at a step 232 to determine the number of bits per row of the matrix field. Because the width of code bits is fixed and known, the number of bits per row is equal to the length of the cue component divided by the known width of a code bit.

In a preferred optional step 234, the image processing module accesses the normalized image instead of the binarized image to facilitate further processing. Binarizing the normalized image often introduces noise pixels, and reading bits from the normalized image yields more reliable pixel values and enables smaller bit patterns to be read.

The processes within a block 236*a* ascertain the value of the variable bit-length matrix code on one side of the cue component. A step 238*a* begins a process that iteratively addresses each row of the matrix field on one side of the cue component. The iteration of reading the code bits occurs in discrete steps as each row of the matrix field is located at successive predetermined offset distances from the cue component. In a step 240*a*, the process reads the data bits in one row of the matrix field. Reading a data bit is preferably done using a predefined fixed threshold or a relative threshold, wherein the relative threshold is determined as a function of the differences between the maximum and minimum pixel intensities. Pattern matching is possible, but limits the flexibility of detecting variable length rows and a variable number of rows.

A decision step 242*a* tests for the lack of code bits, which indicates the end of the code. If the row contains no code bits, the iterative process terminates, otherwise the process continues at a step 244a, to store the row code for later processing. The iterative process continues at a step 246a.

The optional processes within a block 236b then ascertain the value of the variable bit-length matrix code on the opposite side of the cue component. This step is executed if the application program expects variable bit-length matrix fields to be included on both side of the cue component or if the application program attempts to read from both sides of the cue component and uses an algorithm to validate the code using a checksum or other validation process, since the orientation of the matrix code is determined ±180 degrees.

An optional step 238b begins a process that iteratively addresses each row of the matrix field on the opposite side of the cue component. Thereafter, optional steps 240b, 242b, 244b, and 246b perform the same functions as steps 240a, 242a, 244a, and 246a, respectively, but for the bits on the other side of the cue component. The code determination process continues at a step 248, which determines the object ID from the code bits stored in step 244 using a lookup table or other appropriate method.

Gray Scale Code and Arbitrary Shape Code Recognition

FIG. 13 illustrates exemplary gray scale codes 252 useful in recognizing objects. Gray scale codes use multiple thresholds to detect black and white images as well as gray scale images. A gray scale code 252a comprises a connected "cue" component 254a. A dark background 256a surrounds the gray scale code so that the gray scale code can be more readily detected as a connected component. The dark background enables easy detection of the cue component and minimizes the risk of "noise" pixels being considered as part of the cue component. Binarization of the input image sets the threshold to a predetermined level that renders the input image in black and white. Hence, the binarized cue component is white and thus easily recognizable as a cue component (where gray bits are white in the binarized image).

When a cue component is detected, a second predetermined threshold is applied to the normalized image to reveal gray and white code bits within the cue component. This predetermined second threshold may also be a relative threshold, determined as explained above. Thus, binarized cue components 254a, 254c, 254e, and 254g contain counterpart gray scale components 254b, 254d, 254f, and 254h, respectively. The gray and white data bits are disposed in predefined locations relative to the cue component. Note that the lines delineating the data bits are only included in the figure to illustrate the data bits. However, an actual gray scale code would typically not include any such visible lines.

Cue components for gray scale codes need not be rectangular, as shown by exemplary cue components 254c and 254g. Once a connected component is recognized, the second predetermined threshold can reveal any gray scale code bits within the connected component. Alternatively, gray scale codes can use pattern recognition for locating cue components.

The embedded nature of gray scale codes enables using two connected components with a common center. Such an arrangement of connected components is highly unlikely to occur by chance and is readily detected. Exemplary cue component 252e includes a connected component 255e that is centered within another connected component 254e. The orientation of gray scale codes can be defined by stipulating that certain code bits within a cue component are white, gray, or unique combinations thereof. For example, the orientations of gray scale components 254b and 254f are easily ascertained if all but one of the corner bits is required to be gray. The shape of non-symmetrical cue components, such as 254c and 254g, can clearly indicate the orientation of the gray scale code. Gray scale codes can contain checksum bits, such that after the bit sequence is decoded by image analysis, errors in the decoding may be detected.

FIG. 14 illustrates an exemplary arbitrary shape code 260 that is useful in recognizing objects, especially oddly shaped objects. The arbitrary shape code 260 comprises a connected "cue" component 262, and one or more data bits 264. The arbitrary shape code is surrounded by a dark background 268. The dark background enables easy detection of the cue component and data bits and minimizes the risk of "noise" pixels being considered as part of the code. The data bits of an arbitrary shape code are placed in predefined locations relative to the cue component. Alternatively, data bits can be placed in predefined locations relative to a previous data bit so that the location of each data bit is predefined.

The arbitrary shape code can also comprise one or more void areas 266. Such void areas can be inherent in the shape of the physical object to which the code is attached. A void area can influence the placement of data bits. For example, data bit 264b is separated from data bits 264a by void area 266. Alternatively, a void area can be associated with a mechanism that can affect the code, such as in an object 300 that includes a button 302 that, when depressed against a force of a helical spring 304, changes the value of one or more bits in the code, for example, by moving an IR reflective area 306 into contact with the display surface. Alternatively, the button can change the reflectance of any regular bit on any of the aforementioned codes.

Figure 15:
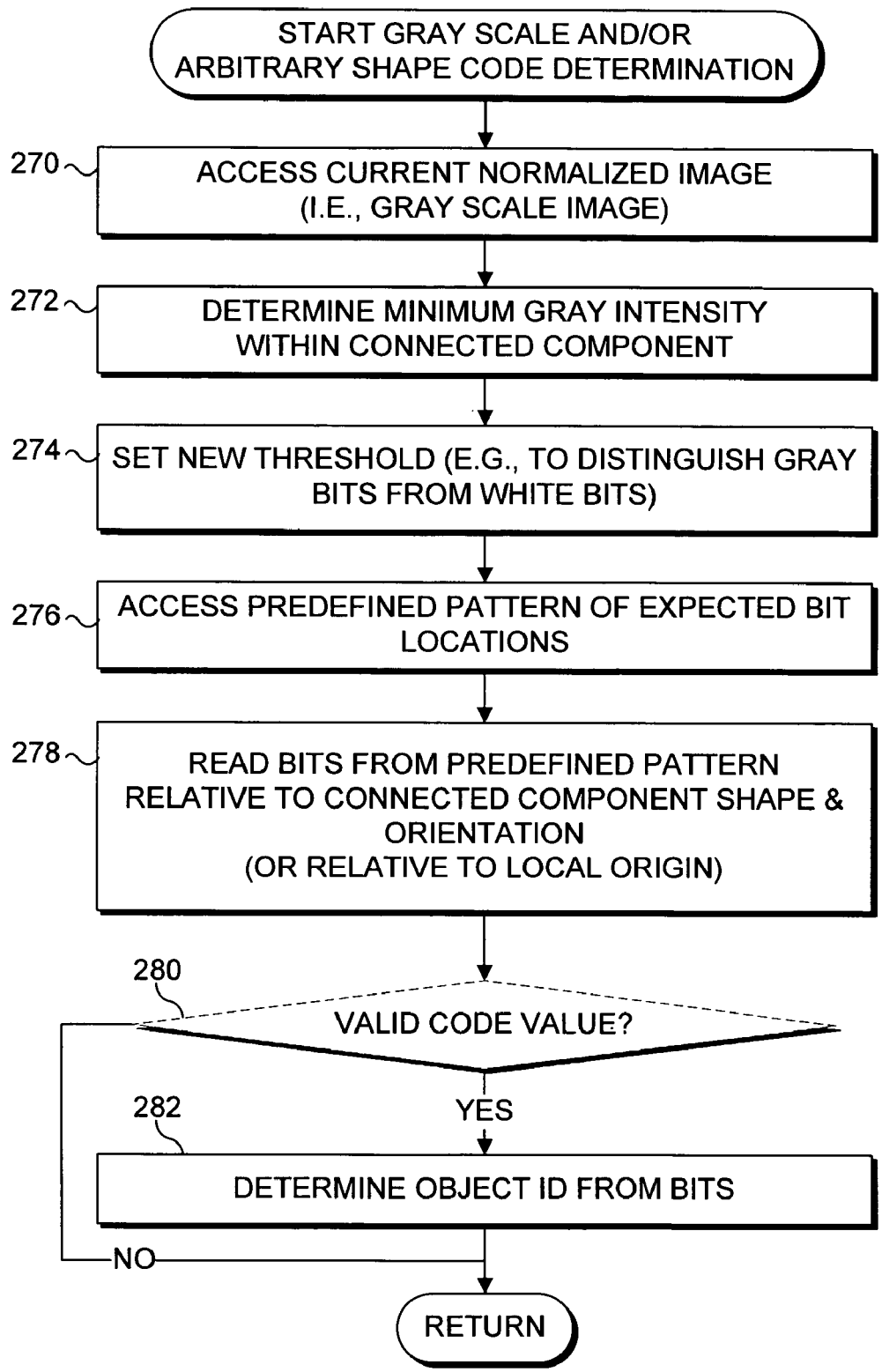
FIG. 15 is a flow chart illustrating the logical steps performed by the image processing module for determining a gray scale or arbitrary shape code.

In FIG. 15, a flow diagram illustrates logic steps performed by the image processing module for determining a gray scale or arbitrary shape code after locating a connected component. In a step 270, the image processing module accesses the current normalized image that contains shades of gray. In a step 272, the image processing module determines the minimum gray intensity within the connected component. This step differentiates the dark background of a gray scale or arbitrary shape code from the code within a gray scale or arbitrary shape code. A step 274 indicates that the image processing module sets a second threshold T defined by the equation:

$$T = (\text{Maximum White Intensity} - \text{Minimum Gray Intensity})/2$$

Applying this threshold to the normalized image distinguishes gray bits from white bits. Steps 270, 272, and 274 are not required for reading bits of an arbitrary shape code. However, accessing the normalized image provides more accurate readings of small bits.

In a step 276, the image processing module accesses predefined patterns of expected bit locations. These predefined locations can apply to bits within the cue component and/or to predefined bit locations outside of, but relative to, the cue component. The image processing module reads the data bits in the pattern that was predefined in step 276 relative to the connected component shape and orientation, in a step 278. These data bits are read using the second threshold.

In an optional decision step 280, the image processing module tests for a valid code value. If the code value is not valid, the process terminates, otherwise the process continues at a step 282 that determines the object ID from the code bits via table lookup or other such method.

In another approach used in connection with the present invention, an encoded pattern on an object is recognized for arbitrary shapes. In this case, it is stipulated that all image pixels outside a region (but within some defined greater region) must be black, while image pixels on the coded pattern are black or white (or gray). This process works better in connection with the above-noted technique of validating the code that is read against a known codebook to ensure that it is indeed a valid code.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A two-dimensional identifier applied to an object for encoding a value so that the value is determinable when the two-dimensional identifier is placed adjacent to a surface sensing system, the two-dimensional identifier comprising:
   (a) a cue component comprising a contiguous radial area of a detectable material to which the surface sensing system is responsive and which is approximated as an ellipse when detected by said surface sensing system, said ellipse having axes that indicate an orientation of the two-dimensional identifier relative to a coordinate system of the surface sensing system, the radial area including a sub-area comprising the non-detectable material disposed at a first predefined radius from a center of the radial area, the sub-area representing a start bit that indicates a start location from which the code portion is to be read;
   (b) a code portion disposed in a predefined location relative to the cue component, said code portion encoding the value with at least one binary element that is detectable by the surface sensing system; and
   (c) a border region that encompasses the cue component and the code portion, the border region comprising a non-detectable material that is not sensed as part of the two-dimensional identifier by the surface sensing system and which functions as an interference mask around the cue component and the code portion, to minimize noise.

2. The two-dimensional identifier of claim 1, wherein the detectable material comprises a reflective material that reflects infrared light to which the surface sensing system responds.

3. The two-dimensional identifier of claim 1, wherein a radial code is used for encoding the value, and wherein the code portion is configured in a region disposed at a second predefined radius from the center of the radial area, greater than the first predefined radius, so that the code portion generally extends around the cue component.

4. The two-dimensional identifier of claim 1, wherein a variable length linear code is used for encoding the value, and wherein:
   (a) the cue component comprises parallel strips of the detectable material that are of substantially equal length and are connected at a first end by a predefined area of the detectable material used as a staff bit, the parallel strips being separated by the non-detectable material at a second end opposite the first end, the non-detectable material at the second end being used as an end bit; and
   (b) the code portion comprises a pattern of detectable areas and undetectable areas, each detectable area and each undetectable area being of predefined dimensions and disposed between the parallel strips and between the staff bit and the end bit.

5. The two-dimensional identifier of claim 1, wherein a variable bit-length code is used for encoding the value, and wherein:
   (a) the cue component includes a predefined dimension and a variable length dimension, said predefined dimension always being smaller than the variable length dimension, the variable length dimension indicating a reference orientation and indicating an extent of the code portion; and
   (b) the code portion begins with a first binary element at a predefined offset from the cue component, and any additional binary elements extend away from the first binary element in at least one of:
      (i) a direction generally parallel to the reference orientation of the cue component, to form a row of binary elements that ends at the extent of the code portion indicated by the variable length dimension;
      (ii) a direction generally perpendicular to the variable length dimension, to form a matrix of binary elements that end when a row does not include at least one binary element that is detectable by the surface sensing system; and
      (iii) predefined directions and predefined distances relative to an immediately preceding binary element, to form a series of binary elements at predefined locations relative to each other.

6. The two-dimensional identifier of claim 1, wherein the value is encoded using a multi-level, variable bit-length code, and wherein:
   (a) the cue component is detectable at a binarization threshold, the cue component having a predefined shape with at least one variable length dimension, and the at least one variable length dimension indicates a reference orientation and indicates an extent of the code portion; and
   (b) the code portion comprises at least one binary element that is detectable at a gray scale threshold, but is not detectable at the binarization threshold.

7. The two-dimensional identifier of claim 6, wherein the at least one binary element that is detectable at the gray scale threshold is disposed within the cue component such that the cue component is uniform at the binarization threshold, but reveals the at least one binary element at the gray scale threshold.

8. The two-dimensional identifier of claim 6, wherein the code portion begins with a first binary element disposed at a predefined offset from a local origin disposed at a predefined location relative to the cue component, and any additional binary elements extend away from the first binary element in at least one of:
   (a) a direction generally parallel to an axis used by the surface sensing system; and
   (b) predefined directions and predefined distances relative to an immediately preceding binary element to form a series of binary elements at predefined locations relative to each other such that the code portion comprises a predefined shape.

9. A method for determining a value from a two-dimensional identifier applied to an object when the object is placed adjacent to a surface of a surface sensing system, comprising the steps of:
   (a) detecting a cue component of the two-dimensional identifier, the cue component comprising a contiguous area that is detectable by the surface sensing system and is encompassed by a border region that is not sensed by the surface sensing system as being part of the two-dimensional identifier and which functions as an interference mask around the cue component to minimize noise;

(b) approximating the cue component as an ellipse having a major axis and a minor axis, to determine a position and orientation of the cue component relative to the surface sensing system;

(c) locating a beginning of a code portion of the two-dimensional identifier relative to the position and orientation of the cue component, the value being encoded in the code portion by a plurality of binary elements, each of a predefined area and the code portion also being encompassed by the border region, which also functions as an interference mask around the code portion to minimize noise;

(d) detecting the plurality of binary elements at predefined locations relative to one of the beginning of the code portion and to each other, with the surface sensing system;

(e) decoding the value that is encoded as a function of the plurality of binary elements that are detected; and (f) determining an object identifier associated with the value of the two-dimensional identifier.

10. The method of claim 9, further comprising the steps of:

(a) illuminating the two-dimensional identifier with infrared light; and (b) detecting infrared light reflected from the cue component and the code portion of the two-dimensional identifier, to detect the orientation of the two-dimensional identifier and to decode the value encoded by the plurality of binary elements.

11. The method of claim 10, further comprising the steps of:

(a) producing a normalized image from the reflection of the infrared light to compensate for a non-uniformity of the infrared light;

(b) producing a binarized image from the normalized image based on a predefined first light intensity threshold;

(c) using the binarized image to determine the cue component; and (d) using the normalized image to detect the plurality of binary elements based on a second light intensity threshold.

12. The method of claim 9, wherein the value is encoded using a radial code, further comprising the steps of:

(a) determining that the cue component comprises a contiguous radial area;

(b) detecting that a sub-area of the contiguous radial area is missing from the contiguous radial area at a first predefined radius from a center of the radial area, the sub-area representing a start bit that from which the beginning of the code portion is to be located;

(c) locating the beginning of the code portion relative to the sub-area and at a second predefined radius from the center of the radial area, said second predefined radius being greater than the first predefined radius; and (d) detecting the plurality of binary elements along an arc at the second predefined radius, said arc being generally concentric relative to the cue component.

13. The method of claim 9, wherein the identifier corresponds to spots of a die, further comprising the steps of:

(a) determining that the cue component comprises a square having dimensions that are substantially equal to predefined dimensions of the die;

(b) determining the orientation of the cue component by rotating a square template until the square template generally aligns with the cue component; and (c) detecting the plurality of binary elements at predefined locations within the cue component, the predefined locations corresponding to a three-by-three square grid of possible spots of the die aligned with the orientation of the cue component.

14. The method of claim 9, wherein the value is encoded using a variable length linear code, further comprising the steps of:

(a) determining that the cue component comprises substantially parallel strips of equal length that are connected at a first end by a predefined area that is used as a start bit, the strips being separated at a second end that is opposite the first end by a second predefined area that is used as an end bit;

(b) locating the beginning of the code portion relative to the predefined area at the first end and between the strips; and (c) detecting the plurality of binary elements between the start bit and the end bit along a center axis that is generally centrally disposed between the strips and is substantially parallel to the strips.

15. The method of claim 9, wherein the value is encoded using a variable bit-length code, further comprising the steps of:

(a) determining that the cue component has a predefined dimension and a variable length dimension, said predefined dimension being smaller than the variable length dimension, the variable length dimension corresponding to a primary axis of the ellipse that approximates the cue component, which indicates a reference orientation and an extent of the code portion;

(b) determining a maximum possible number of binary elements in a row based on the variable length dimension of the cue component;

(c) locating the beginning of the code portion disposed at a predefined offset from the cue component; and (d) detecting the plurality of binary elements in at least one of:

(i) a direction generally parallel to the reference orientation of the code component, to form a row of binary elements that ends at the extent of the code portion indicated by the variable length dimension;

(ii) a direction generally perpendicular to the variable length dimension, to form multiple rows of binary elements that end when a row that does not include at least one binary element is detected; and (iii) predefined directions and predefined distances relative to an immediately preceding binary element, to form a series of binary elements at predefined locations.

16. The method of claim 9, wherein the value is encoded using a multi-level, variable bit-length code, further comprising the steps of:

(a) detecting the cue component at a binarization threshold; and (b) detecting the code portion at a gray scale threshold that is not detectable at the binarization threshold.

17. The method of claim 16, wherein the code portion that is detectable at the gray scale threshold is disposed within the cue component such that the cue component is uniform at the binarization threshold, but reveals the code portion at the gray scale threshold.

18. The method of claim 16, wherein the cue component includes a predefined dimension and a variable length dimension, further comprising the steps of:
   (a) determining that the predefined dimension is smaller than the variable length dimension, the variable length dimension corresponding to a primary axis of the ellipse that approximates the cue component, which indicates a reference orientation and an extent of the code portion;
   (b) determining a maximum possible number of binary elements in a row based on the variable length dimension of the cue component;
   (c) locating a beginning of the code portion at a predefined offset from the cue component; and
   (d) detecting the plurality of binary elements in at least one of:
      (i) a direction generally parallel to the reference orientation of the cue component, to form a row of binary elements that ends at an extent of the code portion indicated by the variable length dimension;
      (ii) a perpendicular direction to the variable length dimension to form a matrix of binary elements that end when a row does not include at least one binary element that is detectable; and
      (iii) predefined directions and predefined distances relative to an immediately preceding binary element to form a series of binary elements at predefined locations.

19. The method of claim 16, further comprising the steps of:
   (a) locating a beginning of the code portion at a predefined offset from a local origin, the local origin being disposed at a predefined location relative to the cue component; and
   (b) detecting the plurality of binary elements in at least one of:
      (i) a direction generally parallel to an axis of the surface sensing system; and
      (ii) predefined directions and predefined distances relative to an immediately preceding binary element to form a series of binary elements at predefined locations relative to each other, such that the code portion has a predefined shape.

20. A memory medium having machine readable instructions for carrying out the steps of claim 9.

21. A system for determining a value from a two-dimensional identifier applied to an object, comprising:
   (a) an interactive display surface having an interactive side adjacent to which the object can be placed, and an opposite side;
   (b) a light source that directs infrared light toward the opposite side of the interactive display surface and through the interactive display surface, to the interactive side;
   (c) a light sensor disposed to receive and sense infrared light reflected back from the patterned object through the interactive display surface forming an image that includes the two-dimensional identifier applied to the object;
   (d) a processor in communication with the light sensor; and
   (e) a memory in communication with the processor, the memory storing data and machine instructions that cause the processor to carry out a plurality of functions, including:
      (i) detecting a cue component of the two-dimensional identifier with the light sensor, the cue component comprising a contiguous area that is detectable by the light sensor and is encompassed by a border region that is not sensed by the light sensor as being part of the two-dimensional identifier and which functions as an interference mask around the cue component to minimize noise;
      (ii) approximating the cue component as an ellipse having a major axis and a minor axis, to determine a position and orientation of the cue component relative to the interactive display surface;
      (iii) locating a beginning of a code portion of the two-dimensional identifier relative to the position and orientation of the cue component, the value being encoded in the code portion by a plurality of binary elements, each of a predefined area and the code portion also being encompassed by the border region, which also functions as an interference mask around the code portion to minimize noise;
      (iv) detecting the plurality of binary elements at predefined locations relative to one of the beginning of the code portion and to each other, with the light sensor; and
      (v) decoding the value that is encoded as a function of the plurality of binary elements that are detected.

22. The system of claim 21, wherein the machine language instructions further cause the processor to detect infrared light reflected from the cue component and the code portion of the two-dimensional identifier with the light sensor, to detect the orientation of the two-dimensional identifier and to decode the value encoded by the plurality of binary elements.

23. The system of claim 22, wherein the machine language instructions further cause the processor to:
   (a) produce a normalized image from the reflection of the infrared light to compensate for a non-uniformity of the infrared light;
   (b) produce a binarized image from the normalized image based on a predefined first light intensity threshold;
   (c) use the binarized image to determine the cue component; and
   (d) use the normalized image to detect the plurality of binary elements based on a second light intensity threshold.

24. The system of claim 21, wherein the machine language instructions further cause the processor to determine an object identifier associated with the value of the two-dimensional identifier.

25. The system of claim 21, wherein the value is encoded using a radial code, and wherein the machine language instructions further cause the processor to:
   (a) determine that the cue component comprises a contiguous radial area;
   (b) detect that a sub-area of the contiguous radial area is missing from the contiguous radial area at a first predefined radius from a center of the radial area, the sub-area representing a start bit that from which the beginning of the code portion is to be located;
   (c) locate the beginning of the code portion relative to the sub-area and at a second predefined radius from the center of the radial area, said second predefined radius being greater than the first predefined radius; and (d) detect the plurality of binary elements along an arc at the second predefined radius, said arc being generally concentric relative to the cue component.

26. The system of claim 21, wherein the identifier corresponds to spots of a die, and wherein the machine language instructions further cause the processor to:

(a) determine that the cue component comprises a square having dimensions that are substantially equal to predefined dimensions of the die;

(b) determine the orientation of the cue component by rotating a square template until the square template generally aligns with the cue component; and (c) detect the plurality of binary elements at predefined locations within the cue component, the predefined locations corresponding to a three-by-three square grid of possible spots of the die aligned with the orientation of the cue component.

* * * * *